(12) United States Patent
Kim

(10) Patent No.: US 6,181,519 B1
(45) Date of Patent: Jan. 30, 2001

(54) TRI-PAD AIR BEARING HEAD SLIDER HAVING LEADING EDGE AND TRAILING EDGE OF AIR BEARING SIDE PADS TAPERED TO MINIMIZE TAKEOFF AND LANDING VELOCITY AND TIME

(75) Inventor: Jung-Jin Kim, Gumi (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/062,665

(22) Filed: Apr. 20, 1998

(30) Foreign Application Priority Data

Apr. 24, 1997 (KR) .................................................. 97-15328

(51) Int. Cl.[7] ...................................................... G11B 5/60
(52) U.S. Cl. ...................................... 360/236.6; 360/236.5
(58) Field of Search ................................ 360/103, 236.5, 360/236.6, 235.7, 235.8

(56) References Cited

U.S. PATENT DOCUMENTS

| | | | |
|---|---|---|---|
| 4,218,715 | 8/1980 | Garnier | 360/103 |
| 4,333,229 | 6/1982 | Ellenberger | 29/603 |
| 4,802,042 | 1/1989 | Strom | 360/103 |
| 4,893,204 * | 1/1990 | Yamada et al. | 360/103 |
| 5,260,845 * | 11/1993 | Takayama et al. | 360/103 |
| 5,267,109 * | 11/1993 | Chapin et al. | 360/103 |
| 5,289,341 * | 2/1994 | Sakaguchi et al. | 360/103 |
| 5,299,079 * | 3/1994 | Kuroda | 360/103 |
| 5,317,465 * | 5/1994 | Chapin et al. | 360/103 |
| 5,343,343 * | 8/1994 | Chapin | 360/103 |
| 5,396,387 * | 3/1995 | Murray | 360/103 |
| 5,430,591 * | 7/1995 | Takeuchi et al. | 360/103 |
| 5,473,485 | 12/1995 | Leung et al. | 360/103 |
| 5,513,056 * | 4/1996 | Kawasaki et al. | 360/103 |
| 5,546,251 * | 8/1996 | Egawa et al. | 360/103 |
| 5,568,981 * | 10/1996 | Nepela et al. | 384/12 |
| 5,612,839 * | 3/1997 | Jacques | 360/103 |
| 5,663,853 * | 9/1997 | Park | 360/103 |
| 5,742,451 * | 4/1998 | Kubota et al. | 360/103 |
| 5,751,516 * | 5/1998 | Hideo et al. | 360/103 |
| 5,751,517 * | 5/1998 | Agarwal | 360/103 |
| 5,771,133 * | 6/1998 | Goto et al. | 360/103 |
| 5,771,134 * | 6/1998 | Kurita et al. | 360/103 |

FOREIGN PATENT DOCUMENTS 63-149811 * 6/1988 (JP) .

OTHER PUBLICATIONS

Air Bearing Design Considerations for Constant Fly Height Applications; Chhabra et al; IEEE Transactions On Magnetics, vol. 30, No. 2, Mar. 1994.*

* cited by examiner

*Primary Examiner*—Brian E Miller
(74) *Attorney, Agent, or Firm*—Robert E. Bushnell, Esq.

(57) ABSTRACT

A novel tri-pad head slider includes a slider body having an air bearing surface and leading and trailing edges with first and second sides extending from the leading edge to the trailing edge; first and second side pads formed on the air bearing surface of the slider body, and disposed at respective first and second sides of said slider body to extend from the leading edge toward the trailing edge of the slider body; and a third pad disposed at the rear center of said slider body at the trailing edge to extend from the trailing edge toward the leading edge of the slider body. Each of the first and second side pads has an opposite tapered portion integrally formed therein and tapered toward the leading and trailing edges of the slider body at predetermined angles for introducing air flow caused by rotation of a disk and reduction of air pressure generated when the slider head takes off from and lands on the disk.

17 Claims, 4 Drawing Sheets

TRI-PAD AIR BEARING HEAD SLIDER HAVING LEADING EDGE AND TRAILING EDGE OF AIR BEARING SIDE PADS TAPERED TO MINIMIZE TAKEOFF AND LANDING VELOCITY AND TIME

CLAIM FOR PRIORITY

This application makes reference to, incorporates the same herein, and claims all benefits accruing under 35 U.S.C. § 119 from an application for HEAD SLIDER OF HARD DISK DRIVE earlier filed in the Korean Industrial Property Office on Apr. 24, 1997, and there duly assigned Serial No. 15328/1997, a copy of which application is annexed hereto.

BACKGROUND OF THE INVENTION

1. Technical Field

The present invention relates to a head slider of a hard disk drive, and more particularly, relates to a head slider of tri-pad type for stable flying height over a magnetic disk.

2. Related Art

Generally, a hard disk drive comprises one or more disks being rotated by a built-in spindle motor and one or more magnetic heads for writing and reading data to and from the disks. The actuator rotates about a pivot fixed on the base, and the magnetic heads mounted on one end of the actuator write or retrieve data on and from the target tracks on the disks while moving above the disks by means of the voice coil motor (VCM) provided on the other end of the actuator.

The magnetic heads are each mounted on the respective ends of head gimbals fixed on the actuator arms, and the heads perform data access operations while floating above the surfaces of disks at uniform flying height on an air cushion generated by the high speed rotation of disks. Such magnetic heads are classified into the head stack assembly and the head gimbal assembly depending on the assembled state, and the pole for performing the actual read/write operations is mounted on the slider itself.

As for the head slider, there have been many efforts to design a floating type head slider that is capable of maintaining a constant flying height over the magnetic disk and reducing the spacing loss between the head slider and the magnetic disk for high density and high storage capacity recording. Recently, a pseudo contact head recording technology has been developed for hard disk drive application to reduce the spacing loss between the head slider and the magnetic disk. Examples of contemporary head sliders using pseudo contact head recording technology are disclosed in U.S. Pat. No. 4,218,715 for Magnetic Head Slider Assembly issued to Garnier, U.S. Pat. No. 4,333,229 for Method Of Manufacturing Thin Film Magnetic Head/Slider Combination issued to Ellenberger, and U.S. Pat. No. 4,802,042 for Side-Vented Magnetic Head Air Bearing Slider issued to Strom. Generally the storage capacity and density of the hard disk drive are determined by the magnetic head and the disks, and therefore the recording density varies depending on the flying height of the slider head since the slider head is usually employed for the magnetic head. That is, the lower the flying height is, the higher the obtained recording density is obtained. However, the flying height must be higher than the gliding height because the slider head may crash against the disk surface if the flying height of the slider head is excessively low, and if the flying height is reduced as low as possible without crashing, the head is brought almost into contact with the disk surface. The slider head must use a CSS (contact start and stop) method to land on the disk surface during standstill of the disk drive and lift off from the disk surface when the disk drive starts operation.

Another example of the slider head adopting such pseudo contact head recording method is a tri-pad type head slider as disclosed, for example, in U.S. Pat. No. 5,473,485 for Tripad Air Bearing Magnetic Head Slider issued to Leung et al. A typical tri-pad type head slider consists of two outer side pads (i.e., rails) and a third pad provided at the trailing edge substantially centrally relative to the outer side pads with air bearing surfaces (ABS) for intermittently contacting the disk surface. The CSS (contact start and stop) method adopted by most hard disk drive systems is an important factor for the slider head to land on the disk surface during the standstill of the disk drive and lift off from the disk surface when the disk drive starts operation in order to enhance the reliability of the hard disk drive. Of the three air bearing surfaces, the third and centrally positioned pad performs a recording operation by contacting the disk surfaces by means of the air bearing surface of the middle rail having a head gap and pole. The remaining two air bearing surfaces of side pads keep the overall balance of the head slider. However, as I have observed, the trailing edges of the outer side pads with air bearing surfaces are susceptible to crashes on the disk surface, and adversely affect the cross section of air bearing surfaces as well as the take-off time for lifting off.

SUMMARY OF THE INVENTION

Accordingly, it is therefore an object of the present invention to provide a novel head slider that has significant contact start and stop characteristics over a magnetic disk.

It is also an object to provide a tri-pad head slider that is designed to maintain a stable flying height over the surface of a magnetic disk.

It is further an object to provide a tri-pad head slider that is designed to prevent crashes on the surface of a magnetic disk and minimize the take-off time from the magnetic disk.

These and other objects of the present invention can be achieved by a novel tri-pad head slider which includes a slider body having an air bearing surface and leading and trailing edges with first and second sides extending from the leading edge to the trailing edge; first and second side pads formed on the air bearing surface of the slider body, and disposed at respective first and second sides of said slider body to extend from the leading edge toward the trailing edge of the slider body; and a third pad disposed at the rear center of said slider body at the trailing edge to extend from the trailing edge toward the leading edge of the slider body. Each of the first and second side pads has opposite tapered portions integrally formed therein and tapered toward the leading and trailing edges of the slider body at predetermined angles for introducing air flow caused by rotation of a disk and reduction of air pressure generated when the slider head takes off from and lands on the disk.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
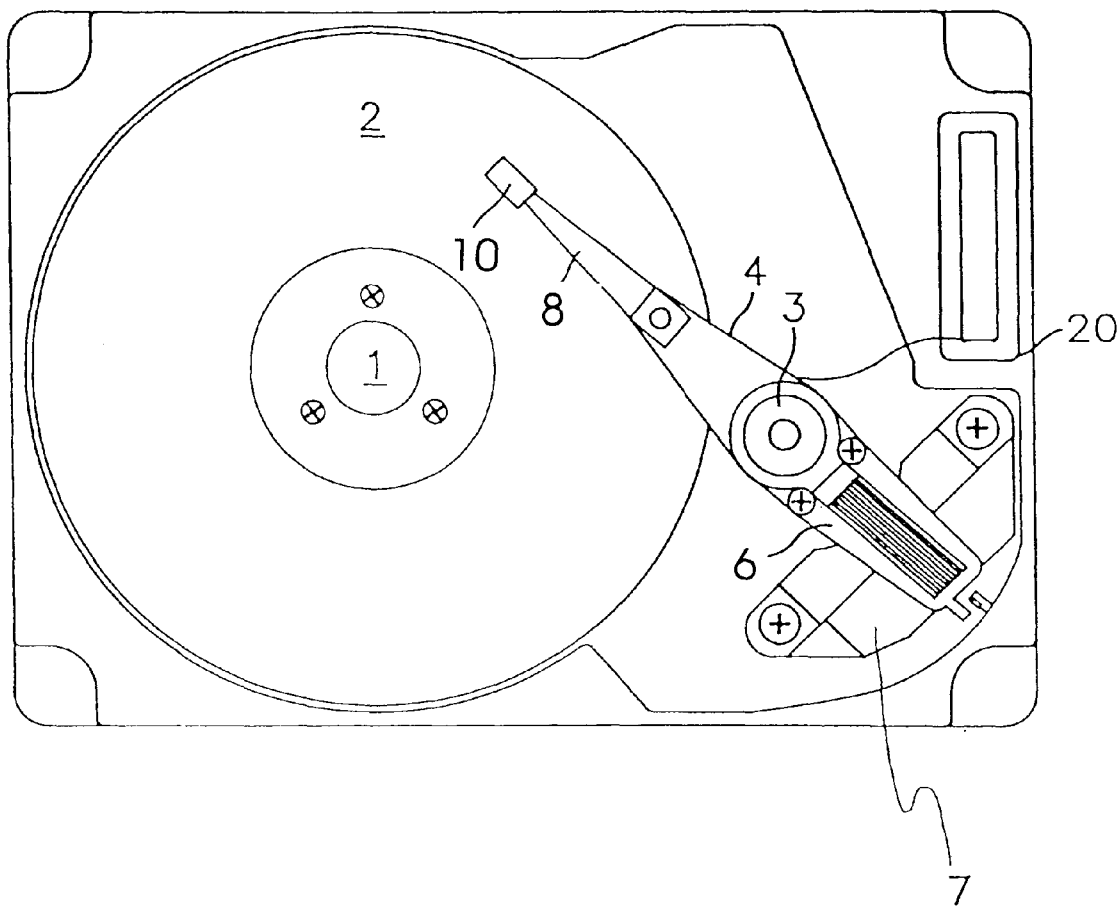
FIG. 1 illustrates a typical hard disk drive.

Referring now to the drawings, FIG. 1, illustrates a typical hard disk drive (HDD). As shown in FIG. 1, the hard disk drive (HDD) includes a housing comprised of a base body 20 and a cover (not shown), a disk 2 which rotates at high speed by a spindle motor 1, and an actuator 8 with a magnetic head slider 10 for writing and reading data recorded on the disk 2. Both base body 20 and the cover are fabricated from aluminum or other material that conducts heat rapidly and acts as a heat sink.

The actuator 4 is secured on base body 20, and is installed to rotate around a pivot 3. As a bobbin 6 installed at one end portion of the actuator 4 moves by the operation of a voice coil motor 7, the head slider 10 installed at the other end portion of the actuator 4 via a load beam 8 moves through the surface of the disk 2, thereby enabling writing and reading of data on individual tracks of the disk 2. As the head slider 10 moves through the surface of the disk 2, it also maintains a minute interval from the disk 2 because the magnetic head slider 10 is separated from the surface of the disk 2 by an air gap or flying height as the disk 2 rotates at high speed. Upon completion of operation of the hard disk drive or when the power is turned-off, the actuator 4 is positioned on a parking zone located adjacent to an innermost track of the disk 2 so as to prevent data previously recorded on the disk 2 from being damaged by the inadvertent contact of the magnetic head with the disk surface.

Figure 2:
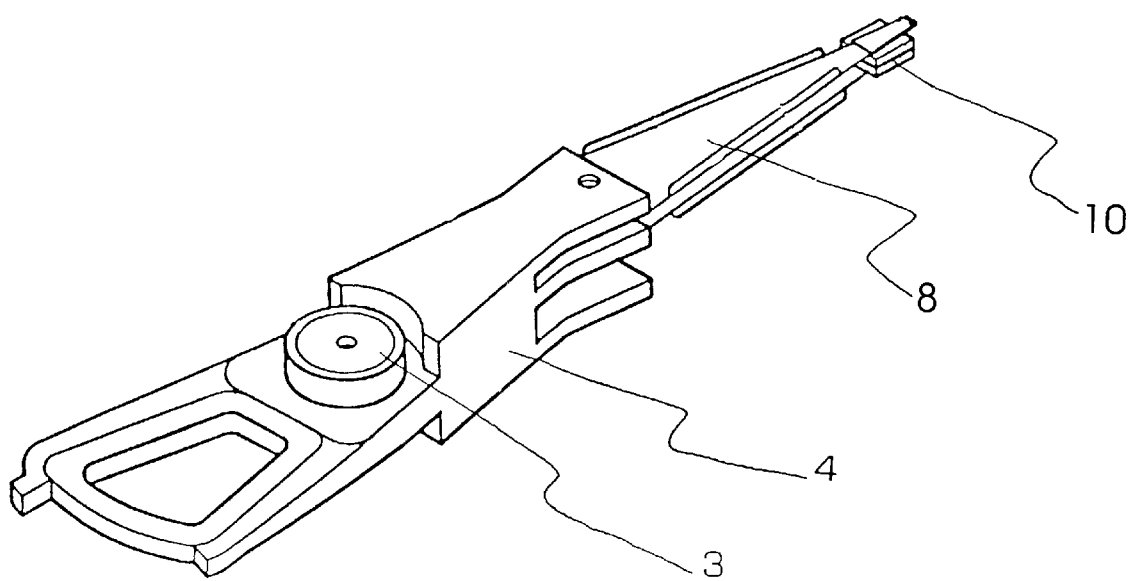
FIG. 2 is a perspective view of an actuator assembly supporting a head slider.

FIG. 2 is a perspective view of the actuator assembly supporting a head slider in a typical disk drive. Actuator 4 rotates about a pivot 3 to access disk 2 by controlling electrical current provided to a voice coil motor 7. Head slider 10, which is made of high magnetic permeability material, performs the recording with its magnetic flux and reproduction of information to or from the disk 2, and is held by the load beam 8 made of a metal, such as a stainless steel sheet. Load beam 8 has a rigid section for suspending the head slider 10 via the gimbal and a resilient section for permitting movement of the head slider 6 in a direction perpendicular to the disk. Once actuator 4 is rotated to a desired position on disk 2, the slider 10 is able to write and read data on and from the disk 2.

Figure 3:
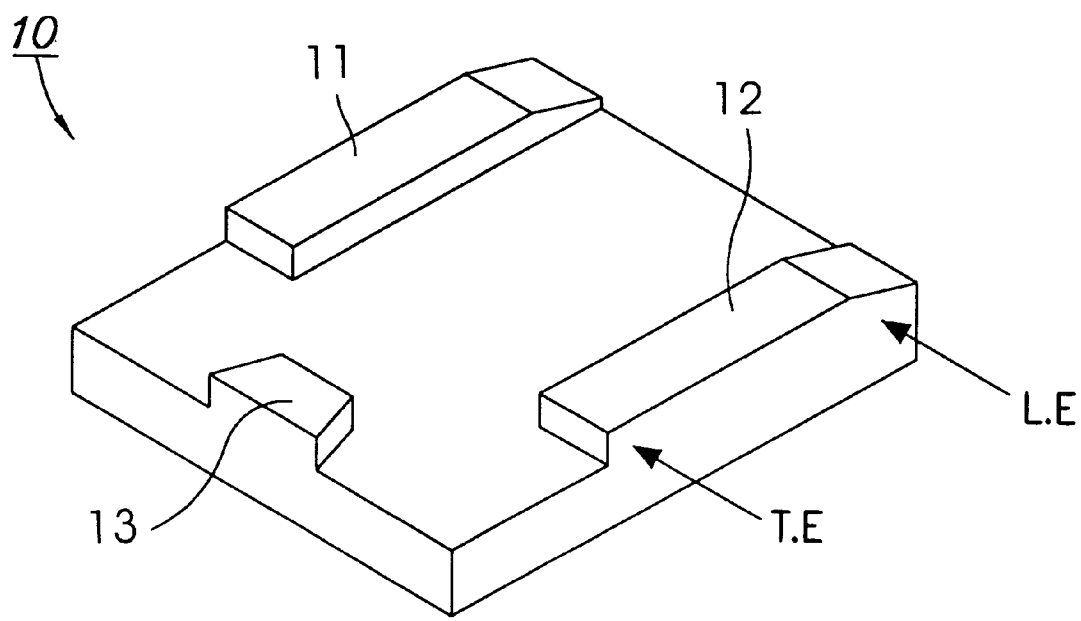
FIG. 3 is a perspective view of a typical tri-pad type head slider of the hard disk drive.
Figure 4:
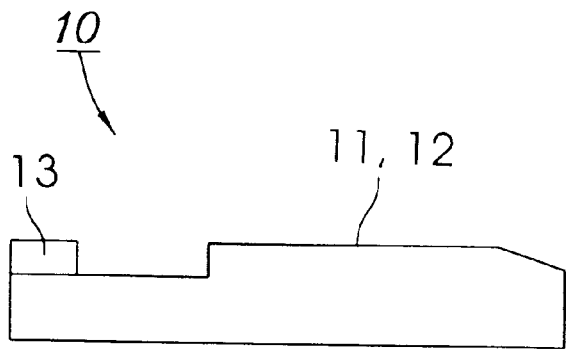
FIG. 4 is a side view of the typical tri-pad type head slider as shown in FIG. 3.

FIGS. 3 and 4 illustrate a typical tri-pad type of head slider adopting such a pseudo contact head recording method for use in a hard disk drive of FIGS. 1 and 2. Referring to FIGS. 3 and 4, the typical tri-pad type head slider 10 consists of three portions (i.e., air bearing surfaces (ABS) and two front outer rectangular pads 11, 12 located along the sides of the slider and a rear central pad 13 located at the trailing edge of the slider) which contact with the disk surfaces during standstill of the drive, while and the outer pads 11 and 12 contact intermittently with the disk surface. The CSS (contact start and stop) method adopted by most hard disk drive systems is an important factor for the slider head to land on the disk surface during the standstill of the disk drive and to lift off from the disk surface when the disk drive starts operation in order to enhance the reliability of the hard disk drive. When repeating standstill and rotation, the tri-pad head slider 10 repeats the landing and lifting off the disk surface by means of air bearing surfaces of side pads 11, 12 and rear central pad 13.

Of the three air bearing surfaces, the rear central pad 13 performs a recording operation by contacting with the disk surfaces by means of the air bearing surface of the middle rail having head gap and pole. The remaining two air bearing surfaces of side pads 11 and 12 along the sides of the head slider 10 keep the overall balance of the head slider 10. Each of side pads 11 and 12 has a tapered portion 11a and 12a, respectively, at a leading edge of the head slider for introducing an air stream caused by the rotation of the magnetic disk 2 and enabling the air bearing surfaces to maintain a flying height over the magnetic disk surface. However, in typical tri-pad head slider designs, as I have described, the trailing edges of the outer side pads 11 and 12 with air bearing surfaces are susceptible to crashes on the disk surface, and adversely affect the cross section of air bearing surfaces as well as the take-off time for lifting off from the disk 2.

Figure 5:
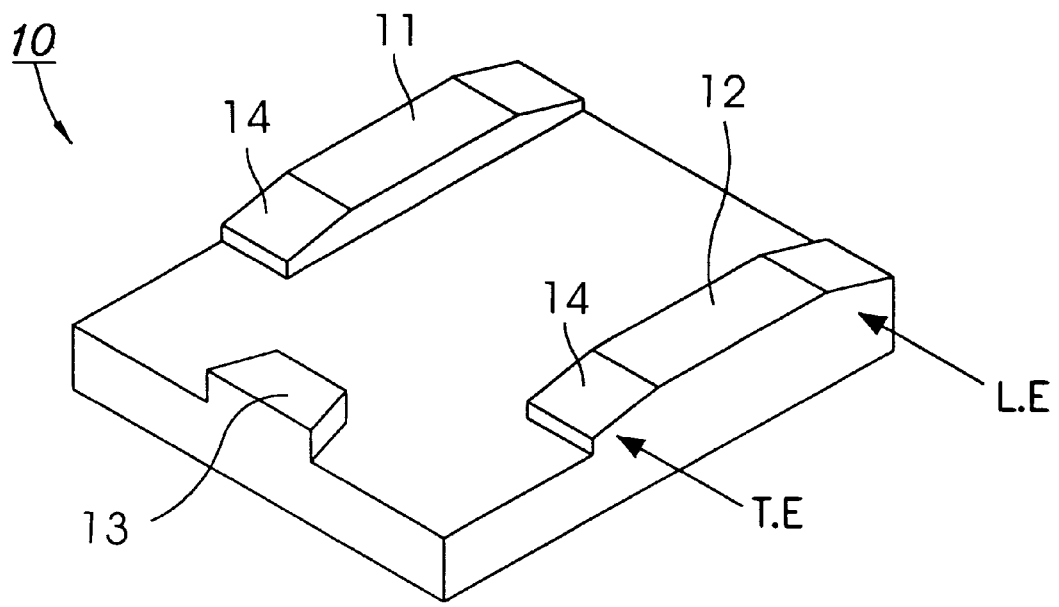
FIG. 5 is a perspective view of a tri-pad type head slider constructed according to a preferred embodiment of the present invention.
Figure 6:
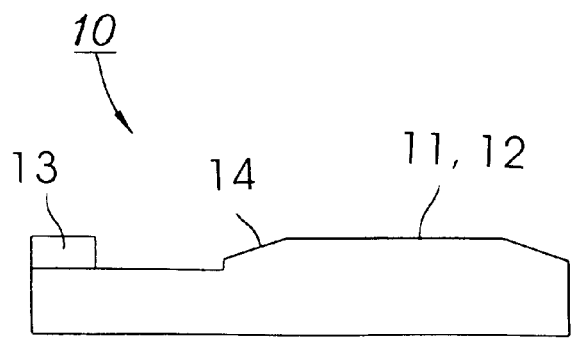
FIG. 6 is a side view of the tri-pad type head slider as shown in FIG. 5.

FIGS. 5 and 6, illustrate a tri-pad type head slider 10 constructed to minimize take-off and landing velocity and time according to the principles of the present invention. FIG. 5 shows a perspective view of the tri-pad type head slider 10, and FIG. 6 shows a side view of the tri-pad type head slider 10. As shown in FIGS. 5 and 6, the tri-pad type head slider 10 is designed with outer rectangular side pads 11 and 12 disposed at equal distance from a leading edge toward a trailing edge, and a rear pad 13 disposed at the rear center of the head slider 10 at the trailing edge so as to extend from the trailing edge toward the leading edge of the slider body 10. The trailing edges of outer rectangular side pads 11 and 12, floating slightly above the disk surface and maintaining a minute gap therebetween, are each provided with a respective inclined ramp (i.e., tapered portion) 11b and 12b. That is, an inclined ramp or tapered portion 11b and 12b is formed on each of the trailing edges of air bearing surfaces of the rectangular side pads (i.e., rails) 11 and 12, in addition to the tapered portions 11a and 12a formed on the leading edges of air bearing surfaces of the rectangular side pads (i.e., rails) 11 and 12 as typically shown in FIGS. 3 and 4. In other words, the ramp surfaces 11b and 12b are formed on the respective angle portions of the trailing edges of the rectangular side pads 11 and 12. The rear pad 13 is centrally located at the trailing edge of the slider 10, and is trapezoidal in shape. The rear pad 13 records data on the disk, and the remaining two air bearing surfaces of rectangular side pads 11 and 12 serve as balancers when the slider head 10 is moving.

When the head slider 10 floats above the disk 2 to read data therefrom while rotating at high speed, and lands on the parking zone by means of counter electromotive force during standstill of the hard disk drive or when power is off, the inclined ramps 14 formed on the angle portions of the air bearing surfaces can considerably reduce head crashes against the disk surfaces of the disks due to the ramp structure formed on the leading and trailing edges of the head slider 10 which reduces the influence of air pressure on the head slider 10.

In addition, when the surface air pressure generated by the high-speed rotation of the disk drive is applied to the head slider 10, such air pressure is reduced by the above ramp surfaces when the head slider 10 is lifted and landed, which can improve the CSS characteristics of the head slider 10 taking off and landing on the magnetic disks.

In a preferred embodiment, the tri-pad head slider is designed with the trailing edge tapered portions 11*b* and 12*b* of the rectangular side pads 11 and 12 having an inclined angle not less than 15° and not more than 35°, preferably at 25°, with respect to an air bearing surface. The leading edge tapered portions 11*b* and 12*b* of the rectangular side pads 11 and 12 of the head slider 10 have the same inclined angle, although the inclined angle can be adjusted, to best lift the slider 10 above the surface of the magnetic disk 2 when the disk 2 starts rotation.

As described above, the novel tri-pad head slider design of the present invention offers significantly improved contact start and stop characteristics, and eliminates head crashes as well as reducing the landing and taking-off time from the magnetic disk.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A tri-pad head slider of a disk drive, comprising;
   a slider body having an air bearing surface and leading and trailing edges with first and second sides extending from the leading edge to the trailing edge;
   first and second side pads formed on said air bearing surface of said slider body, and disposed at respective first and second sides of said slider body and extending from the leading edge toward the trailing edge of said slider body; and
   a third pad disposed at a rear center of said slider body at the trailing edge to extend from the trailing edge toward the leading edge of said slider body;
   said first and second side pads each having opposite tapered portions integrally formed therein and tapered toward the leading and trailing edges of said slider body at predetermined angles of not less than 15° and not more than 35° with respect to said air bearing surface for introducing air flow caused by rotation of a disk and reduction of air pressure generated when the slider head takes off from and lands on the disk.

2. The tri-pad head slider of claim 1, said third pad having a trapezoidal shape provided at the trailing edge of the slider body and substantially centrally located relative to a longitudinal axis between the leading and trailing edges.

3. The tri-pad head slider of claim 2, said first and second side pads being disposed uniformly and at equal distance from the leading edge toward the trailing edge of the slider body.

4. The tri-pad head slider of claim 1, said opposing tapered portions being tapered toward the leading and trailing edges of the slider body at said predetermined angles of 25° with respect to said air bearing surface.

5. A disk recording system, comprising:
   a recording medium having a recording surface;
   a head slider; and
   means for supporting said head slider closely adjacent to the recording surface of said recording medium, and for moving said head slider relative to the recording surface of said recording medium;
   said head slider having a body with an air bearing surface and leading and trailing edges with first and second sides extending from the leading edge to the trailing edge, first and second side pads formed on said air bearing surface of said body and disposed at respective first and second sides of said body to extend from the leading edge toward the trailing edge of said body, a third pad disposed at a rear center of said body at the trailing edge to extend from the trailing edge toward the leading edge of said body, and said first and second side pads each having at least a tapered portion integrally formed therein and tapered toward the trailing edge of said body at a predetermined angle of not less than 15° and not more than 35° with respect to said air bearing surface for reduction of air pressure generated when the slider head takes off from and lands on a disk.

6. The disk recording system of claim 5, said head slider having said third pad in a trapezoidal shape provided at the trailing edge of said body and substantially centrally located relative to a longitudinal axis between the leading and trailing edges.

7. The disk recording system of claim 6, said head slider having first and second pads disposed uniformly and at equal distance from the leading edge toward the trailing edge of said body.

8. The disk recording system of claim 5, said head slider having a further tapered portion tapered toward the leading edge of said body at said predetermined angle of not less than 15° and not more than 35° with respect to said air bearing surface.

9. The disk recording system of claim 8, said head slider having said further tapered portion tapered toward the leading edge of said body at said predetermined angle of 25° with respect to said air bearing surface.

10. The head slider of claim 5, said tapered portion being tapered toward the trailing edge of the slider body at said predetermined angle of 25° with respect to said air bearing surface.

11. A head slider of a disk drive, comprising:
    a slider body having an air bearing surface and leading and trailing edges with first and second sides extending from the leading edge to the trailing edge;
    first and second sidepads formed on said air bearing surface of said slider body, and disposed at respective first and second sides of said slider body to extend from the leading edge toward the trailing edge said slider body; and
    a third pad disposed at a rear center of said slider body at the trailing edge to extend from the trailing edge toward the leading edge of said slider body;
    said first and second side pads each having two, opposing tapered portions tapered toward the leading edge and the trailing edge, respectively of said slider body at angles of not less than 15° and not more than 35° with respect to said air bearing surface for reduction of air pressure generated when the slider head takes off from and lands on a disk.

12. The head slider of claim 11, said third pad having a trapezoidal shape provided at the trailing edge of the slider body and substantially centrally located relative to a longitudinal axis between the leading and trailing edges.

13. The head slider of claim 12, said first and second pads being disposed uniformly and at equal distance from the leading edge toward the trailing edge of the slider body.

14. The head slider of claim 11, the angle of each of said tapered portions being 25° with respect to said air bearing surface.

15. The head slider of claim 11, the angles of said tapered portions tapered toward the leading edge of said slider body being 25° with respect to said air bearing surface.

16. The head slider of claim 11, the angles of said tapered portions tapered toward the trailing edge of said slider body being 25° with respect to said air bearing surface.

17. The head slider of claim 11, said third pad being located substantially centrally relative to a longitudinal axis between the leading and trailing edges of the slider body, and the leading portion of said third pad being located rearward of said tapered portions tapered toward the trailing edge.

* * * * *